United States Patent [19]
Potin

[11] 3,748,709
[45] July 31, 1973

[54] APPARATUS FOR MAKING THE STOPS OF A SLIDE FASTENER
[75] Inventor: Marcel Potin, Choisy-le-Roi, France
[73] Assignee: Societe Financiere Francaise De Licences Et Brevets, Choisy-le-Roi, France
[22] Filed: Aug. 4, 1970
[21] Appl. No.: 60,891

[30] Foreign Application Priority Data
Aug. 7, 1969 France .............................. 6927109
June 1, 1970 France .............................. 7019985

[52] U.S. Cl. ....................... 29/34 A, 156/66, 156/73
[51] Int. Cl. ............................................. A44b 19/36
[58] Field of Search .......................... 29/34 A, 408; 156/66, 73

[56] References Cited
UNITED STATES PATENTS
2,619,148  11/1952  Camp ................................. 29/34 A
3,340,594  9/1967  Frohlich et al. .................... 29/408
3,510,379  5/1970  Heimberger ..................... 156/66 X
3,577,292  5/1971  Obeda ................................. 156/73

FOREIGN PATENTS OR APPLICATIONS
630,674  6/1936  Germany ........................... 29/34 A
688,264  6/1964  Canada ............................... 29/408

Primary Examiner—Andrew R. Juhasz
Assistant Examiner—Z. R. Bilinsky
Attorney—Arthur B. Colvin

[57] ABSTRACT

The invention provides a process for making the stops at the ends of the rows of interlocking units in a slide fastener by moulding these stops from thermoplastic material directly on to the ends of the rows of the interlocking units, the operation being performed by positioning the corresponding row of interlocking units between two complementary parts forming a stamp and a block and by also placing between these two parts a fragment of thermoplastic material obtained by cutting it from the end of a continuous strip of such material which is moved forward in jerks, the fragment being moulded by subjecting it to the effect of heat, for example by transmitting ultrasonic vibrations to it while it is held between the two parts which form the stamp and the block and, after joining, leave between them a die cavity in the shape of the stop which is to be made.

7 Claims, 15 Drawing Figures

INVENTOR
MARCEL POTIN

By
ATTORNEY

INVENTOR
MARCEL POTIN

By
ATTORNEY

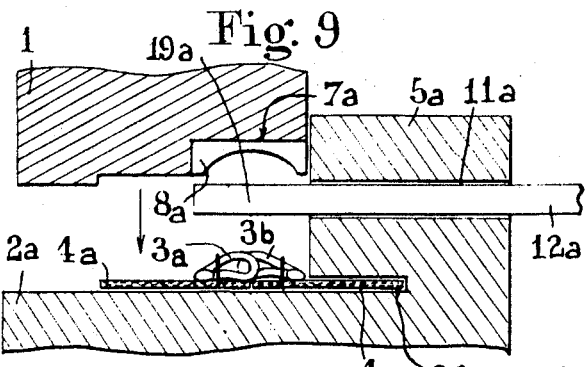
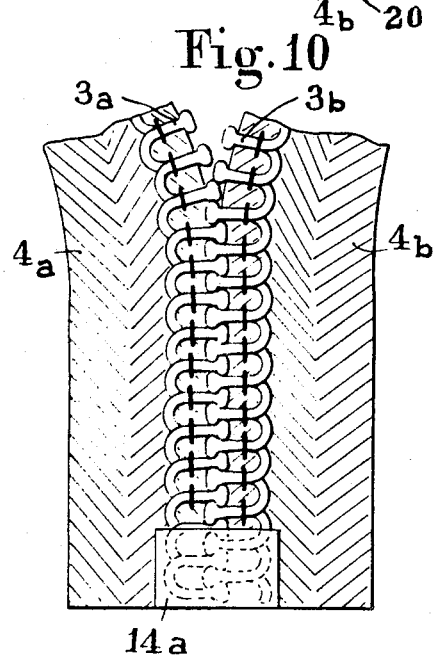
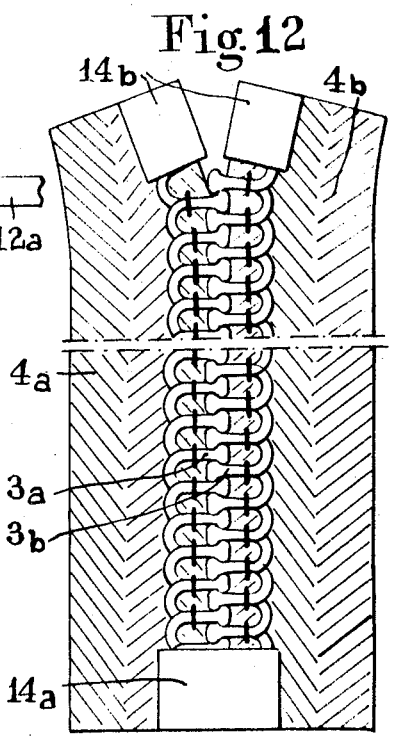
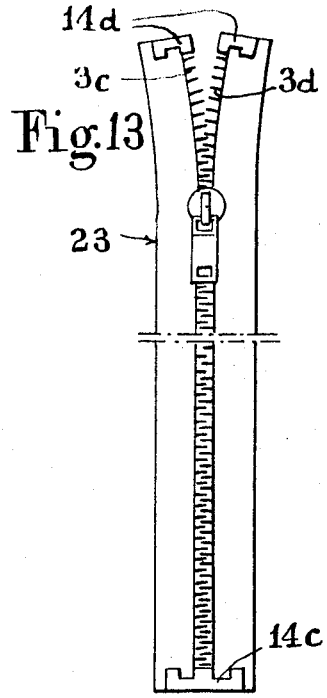
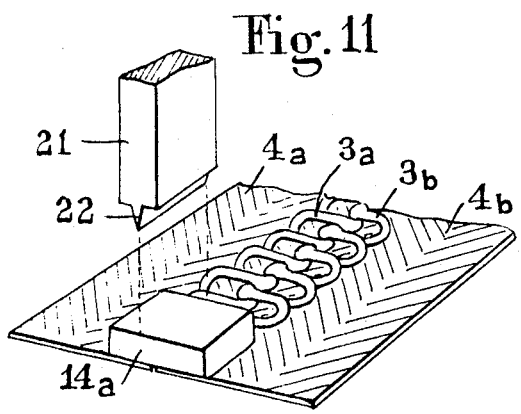
INVENTOR
MARCEL POTIN

INVENTOR
MARCEL POTIN

By  *Arnold B Colin*

ATTORNEY

APPARATUS FOR MAKING THE STOPS OF A SLIDE FASTENER

This invention relates to the making of stops provided at the ends of the two rows of interlocking units in a slide fastener, in order to limit the travel of the latter's control slide.

Such stops can usefully be made by moulding them out of thermoplastic material directly on to the rows of interlocking units. For this purpose, the ends of these rows are inserted between the two complementary parts of a suitable mould and after joining the latter, the moulding operation is carried out by injecting thermoplastic material in a liquid state.

Such a process has undeniable advantages. However, it has a certain number of disadvantages which are inherent in the method of moulding used.

Thus, the two complementary mould parts have to be very well locked together to make it possible to inject the thermoplastic material in a liquid state under pressure. This means, therefore, that the two mould parts have to be accurately machined and the two rows of interlocking units and the supporting tape perfectly positioned.

However, despite the precautions taken, leakages of the thermoplastic material do occur, from the fact that this is injected in a liquid state under comparatively high pressure.

The object of this invention is accordingly to make stops of this kind by a process which is free from the disadvantages mentioned above.

The invention also covers various specific forms of putting this process into operation, which make it possible to make various types of stops at the ends of slide fasteners.

The process of the invention basically features the fact that a stop is made by positioning the corresponding row of interlocking units between two complementary parts forming a stamp and a block respectively and by also placing between these two parts a fragment of thermoplastic material obtained by cutting it from the end of a continuous strip of such material which is moved forward in jerks, and the fact that this fragment is moulded by subjecting it to the effect of heat, e.g. by transmitting ultrasonic vibrations to it while this fragment is held between the two parts which form a stamp and a block and, after joining, leave a die cavity between them in the shape of the stop which is to be made.

In a preferred form of this process, the fragment of thermoplastic material is moulded by ultrasonics, by activating one of the two complementary mould parts by ultrasonic vibrations, in practice the movable part forming the stamp.

This invention also includes a device for putting this process into operation. This device is made up of a combination of two complementary mould parts forming a stamp and a block respectively, at least one of which is movable in relation to the other, and which, after joining, leave a die cavity between them in the shape of the stop to be made, suitable feed means moving a strip of thermoplastic material forward in jerks so that its end engages between the "sonotrode" sonic electrode and the block, while means of cutting then cut off the end of this strip which has thus been inserted between these two parts.

However, this device can be constructed in different ways according to the particular methods of putting the process itself into operation.

Moreover, other features and advantages of the process and the device of the invention will be apparent from the following description of a constructional example of the latter.

This description is given with reference to the accompanying drawing, which is by way of example only, and wherein:

FIG. 9 is a vertical section view of another form of construction of the device of the invention;

FIG. 10 is a partial view from above showing a stop made with this device, the purpose of which is to join together the two rows of interlocking units of the same fastener;

FIG. 11 is a view diagrammatically illustrating a supplementary operation which can be carried out on a stop of this kind in order to split it lengthwise;

FIGS. 12 and 13 are views from above of fasteners comprising end stops made with the devices in FIGS. 9 and 11;

Figure 1:
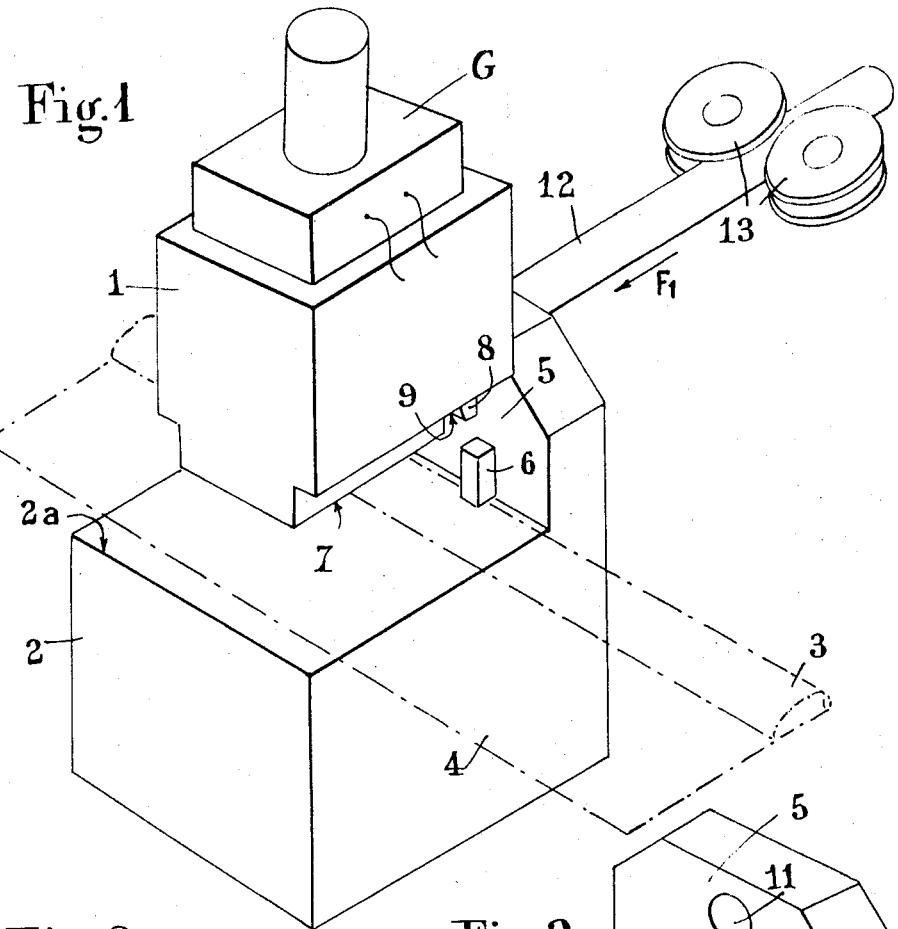
FIG. 1 is a view of the device for putting the process of the invention into operation.
Figure 2:
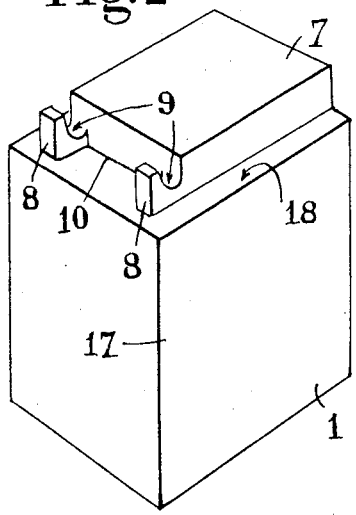
FIG. 2 is a view of the movable stamp incorporated in this device, after inversion thereof.
Figure 3:
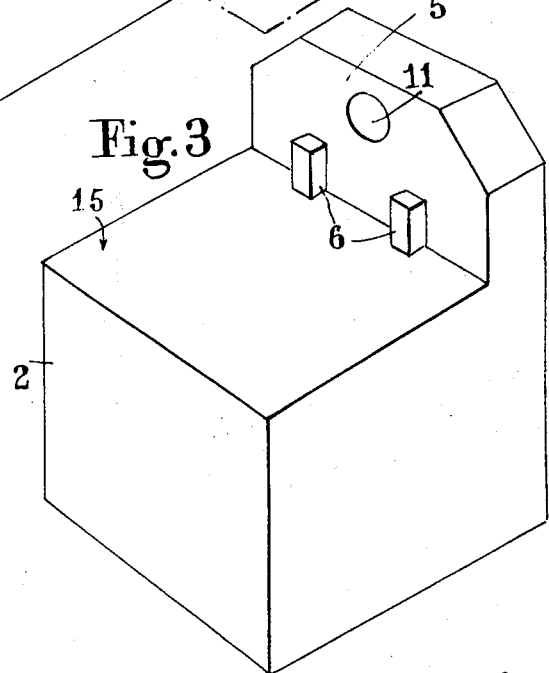
FIG. 3 is a view of the block in this same device.

The device shown in FIGS. 1 to 7 is basically made up of a combination of two complementary mould parts one of which forms a movable stamp 1 and the other a corresponding fixed block 2.

The top face 15 of the latter is designed to act as a support for the row of interlocking units 3 on which a stop is to be made at specific intervals. This block also acts as a support for the tape 4 on one selvedge of which this row of interlocking units is fixed with stitches 16.

On one of its sides, the top face 15 of this block comprises a vertical cheek 5 extending facing the corresponding side wall 17 of the sonotrode sonic electrode 1.

Suitable feed means (not shown) are also provided to move the row of interlocking units forward in jerks, so as to bring it to a standstill, at regular intervals of time, underneath the stamp 1, with a view to making a stop by the process of the invention.

In the constructional form shown, the device is designed to mould such a stop out of thermoplastic material by ultrasonics. For this purpose, the stamp 1 is fitted up to constitute a sonotrode sonic electrode activated by ultrasonic vibrations, in the same way as the sonotrodes fitted in some ultrasonic welding equipment. Moreover, this unit is mounted on an ultrasonic vibrations generator G which is capable of transmitting such vibrations to it. On the edge facing the cheek 5 of the block, the bottom face 18 of this sonotrode comprises a cut-out section 7 designed to form the die cavity for the stop tobe made. This die cavity is bounded at the ends by two projecting teeth 8 which are connected to the sonotrode 1 by means of two incurved portions 9.

There is the same distance between these two teeth as between two projecting studs 6 provided on the inside face of the vertical cheek 5 of the block. These two teeth are in fact designed to slide against these two studs when the sonotrode is applied to the block.

There is a clear space 10 between the two teeth 8, designed to form the die cavity for the stop to be made, this in combination with the clear space between the two studs 6.

However, these units are also intended to keep the row of interlocking units at a standstill during the moulding of the stop, as will be explained later.

The vertical cheek 5 of the block comprises an aperture 11 the axis of which is positioned transversally in relation to the row of interlocking units 3. The end of a strip 12 of thermoplastic material passes through this aperture. By means of this arrangement, the end part 19 of this strip, which projects beyond the vertical cheek 5 of the block, can be inserted in the clear space provided between the two teeth 8 of the sonotrode, while the latter is in a raised position (see FIG. 4).

Moreover, this device comprises suitable feed means capable of causing the strip 12 to move forward in jerks in the direction of the arrow $F_1$, in order to insert the end thereof in the cut-out section in the side of the sonotrode. These feed means may possibly consist of ordinary pulleys 13 positioned on either side of the strip 12.

Figure 4:
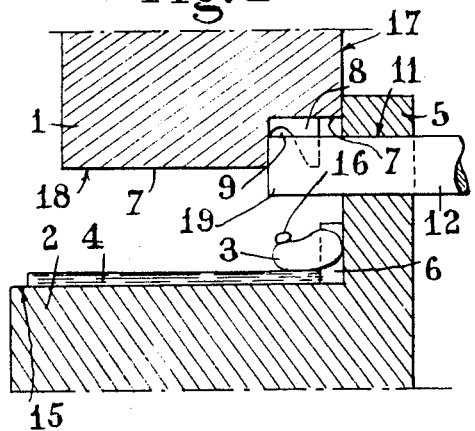
FIGS. 4 to 6 are partial vertical section views of this device, showing it during the various successive stages of operation.
Figure 5:
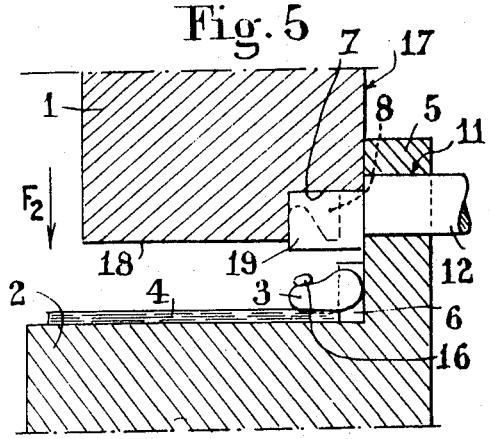

The way in which this device works, in order to put the process of the invention into operation, is as follows:

The row of interlocking units 3 and its supporting tape 4 move along the top face 2a of the block, kept slightly away from the inside face of the vertical cheek 5 of the latter. When a spot along this row of interlocking units, where a stop is to go, comes underneath the sonotrode, a translatory movement in a transversal direction is imparted to this row and to the tape 4 in order to apply the interlocking units against the vertical cheek 5 of the block. In these circumstances, the two studs 6 on this cheek penetrate into the corresponding spaces in the interlocking units, as shown in FIG. 4. This consequently brings this row of units to a standstill.

At that time, the sonotrode 1 is in a raised position, so that it is away from the block. Moreover, the end part 19 of the strip 12 of thermoplastic material is inserted in the cut-out section in the side of the sonotrode.

Then, during a second stage, the latter is moved in the direction of the arrow $F_2$ towards the block, by suitable feed means. In these circumstances, the end part 19 of the strip 12 is sheared between the cheek 5 and the sonotrode. This consequently cuts off the corresponding fragment of thermoplastic material which is thenceforth drawn along by the sonotrode, this fragment being positioned between the two teeth 8 of the latter (see FIG. 5).

Figure 6:
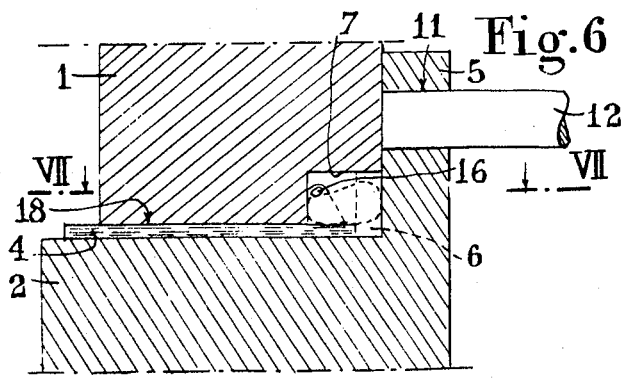
Figure 7:
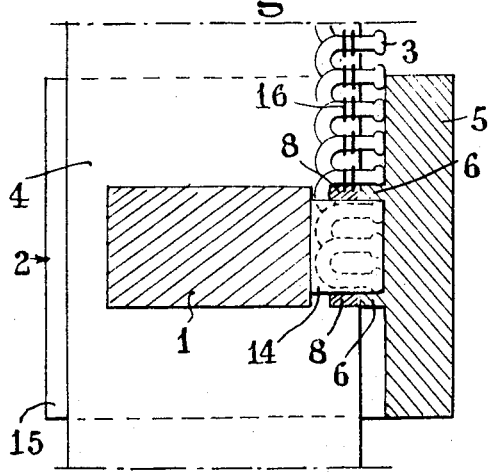
FIG. 7 is a cross-section along the line VII—VII in FIG. 6.
Figure 8:
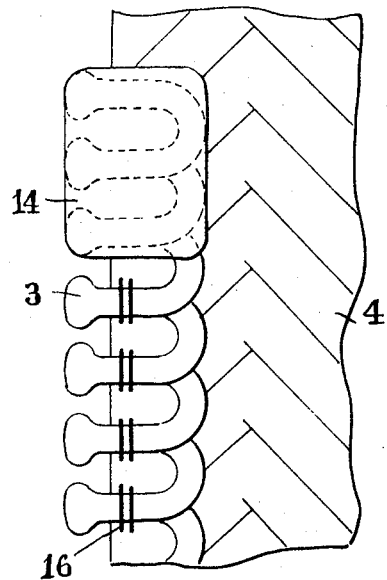
FIG. 8 is a view from above of a stop made with this device, using the process of the invention.

At the end of the movment, when the sonotride is applied against the block, the teeth 8 are positioned against the studs (see FIGS.6 and 7). The teeth 8 are thus engaged in the spaces between the interlocking units inside which the studs 6 were already engaged.

These teeth and these studs form the boundary of the die cavity at its two ends. In fact, the ultrasonic vibrations transmitted by the sonotrode to the fragment 19 of thermoplastic material soften this fragment and mould it in the corresponding die cavity. The material of this fragment then penetrates beteen the interlocking units which are in the die cavity, and this material is moreover welded to the interlocking units when the latter are also made of thermoplastic material.

In any case, the interlocking units are submerged inside the plastic part 14 so obtained and which forms a stop on the corresponding fastener.

After this operation, the sonotrode 1 is again raised to the "up" position and the row of interlocking units resumes its forward movement, while the strip 12 of thermoplastic material is again pushed in the direction of the arrow $F_1$ in order to insert the end part in the cut-out section in the side of the sonotrode.

This device and the process covered by the invention make it possible to make a series of stops designed ultimately to constitute so many separate fasteners of a specific length, at an industrial rate, along one continuous chain of interlocking units.

Now, this device and this process have the advantage of being free from the disadvantages which were encountered when making stops of this kind by moulding them by injecting plastic material, In fact the constituent parts of the device do not need to be as carefully machined as the parts of the injection mould. Moreover, there is no risk of the thermoplastic material leaking since it is not subjected to such high pressure as in the case of injection moulding.

The process and the device of the invention are not limited to the single example described above. Moreover, this device could comprise the following modifications.

a. The die cavity used for moulding the stop could be fitted on the block, instead of being positioned on the sonotrode.

b. The plastics feed strip could pass through an aperture provided in a vertical cheek borne by the sonotrode, instead of passing through the cheek 5 on the block. In fact, due to the flexibility of this plastics strip, it could very well follow the movements of the sonotrode.

c. This strip could be brought between the sonotrode and the block from any desired direction. In fact, it would be possible to run this strip longitudinally, or in any other direction, forming any angle in relation to the axis of the row of interlocking units.

The process and the device of the invention can be used to make stops at the ends of the rows of interlocking units corresponding to the opening end of a slide fastener.

However, this process and this device can also be used to make stops at the opposite end, i.e. at the end where the two rows of interlocking units are inseparably joined. FIG. 9, in fact, shows a device designed for this purpose.

The general structure of this is the same as that of the device in FIGS. 1 to 7. In fact, it comprises the same components, which thus bear the same reference numbers, with the letter "a" suffixed. However, the fixed block 2a is arranged so as to act as a support for the two tapes 4a and 4b bearing the two corresponding rows of interlocking units 3a and 3b. For this purpose, the side cheek 5a on this block has a slot 20 which can take one of the two tapes 4a or 4b. This slot thus constitutes a means of guiding the continuous chain formed by the two rows of interlocking units and their supporting tapes.

Moreover, in this form of construction, the studs 6 previously provided are eliminated.

Of course, the dimensions of the die cavity 7a bounded by the teeth 8a are suitable to make a stop 14a straddling the two rows of interlocking units 3a and 3b as shown in FIG. 10.

The process of making a stop of this kind by means of this device is the same as in the previous case. However, a stop 14a straddling the two rows of units 3a and 3b is so obtained and this holds the corresponding interlocking units at that spot, thus joining them together. This device thus makes it possible effectively to make a stop for the closed end of a slide fastener.

However, this same device can be used indiscriminately to make the stops at both ends of the same fastener, i.e. the opening end and the closed end, provided one of the two stops made is subsequently cut lengthwise along the middle to divide it into two separate stops, one on each of the two corresponding rows of interlocking units.

This subsequent cutting operation can be carried out by means of a suitable tool. This may consist of a standard knife or any other cutting tool, e.g. scissors, a mechanical or pneumatic press, a circular saw, etc.

However, this cutting operation can also be done ultrasonically by using a sonotrode 21 with a sharp edge 22 (see FIG. 11).

In fact, the ultrasonic vibrations transmitted by this cutting edge have the effect of making a slot along the whole length of the corresponding stop 14a. Of course, this slot is made so as to cut this stop into two equal halves 14b, on either side of the median axis of the fastener chain. In this way two separate stops are therefore obtained, each of which is borne by one of the two rows of interlocking units of the fastener (see FIG. 12).

In these circumstances, the device shown in FIG. 9 makes it possible indiscriminately to make stops designed to fit one or other end of the same fastener.

In the one case, the stop so obtained can be used as it is. In the other, it is sufficient to subject it to a very simple supplementary operation to cut it into two equal parts lengthwise.

In this connection, it should be noted that this operation can be carried out either immediately after moulding of the stop or later, at any desired time. Of course, the two stops 14a provided at the two ends of the same fastener can be made simultaneously.

For this purpose, it is sufficient to use two devices such as the one described in FIG. 9, allowing a gap between them corresponding to the length of the corresponding fastener.

The working of these two devices is then synchronised so as to make the two stops 14a at the same time. It is then sufficient to split one of them lengthwise to obtain the two separate stops which are to equip the opening and closing end.

It should also be noted that the sonotrode 21 used for this purpose can be associated with the device for making the corresponding stop. In fact, this sonotrode can be fixed on a rotating head also bearing the sonotrode 1. Such an arrangement makes it possible successively to apply the sonotrode 1a when a stop 14a is made, then the sonotrode 21 to cut this stop lengthwise. However, it is obviously possible to make another suitable arrangement making it possible to use the sonotrodes one after the other.

Moreover, it goes without saying that the stops made by this process can be of different shapes. Thus, FIG. 13 shows a slide fastener bearing the overall reference 23 at the ends of which stops 14c and 14d of different shapes have been moulded, which overlap sideways in relation to the two corresponding rows of interlocking units 3c and 3d, contrary to the previous case.

This invention also covers a particular process for making and fitting a slide fastener to a specific article, applying the process for making end stops as described above.

In accordance with this making and fitting process, a length of fastener chain is first fixed to the two edges of the opening in the corresponding article, e.g. a garment. This fixing is done while the interlocking units of the two rows of the chain are joined at both ends of the length in question. A slide is then threaded on to it, if this operation has not been done before.

But the two rows of interlocking units then have to be joined beyond the slide so that the length of fastener chain is closed at both ends. The latter are then successively put through a device such as the one shown in FIG. 9.

When the two stops 14a have been made, straddling the two rows of interlocking units, one of these stops is split, as previously described. This operation can then be carried out immediately or later, at any desired time.

Figure 14:
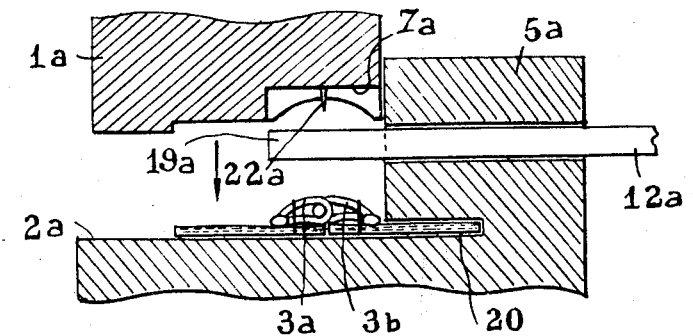
FIG. 14 is a vertical section view of yet another form of the device of the invention.
Figure 15:
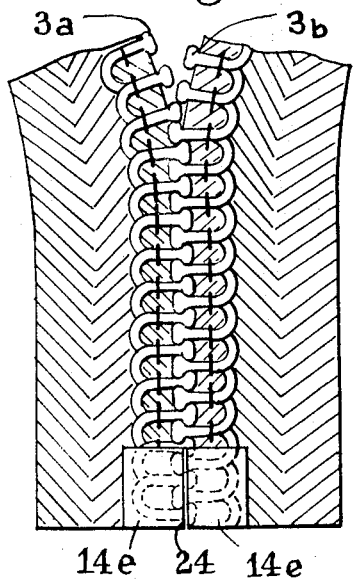
FIG. 15 is a partial view from above of a fastener comprising stops made with this device.

However, the device and the making process covered by the invention are not limited to this one application. Moreover, this process and this device can themselves be subject to operational variations. In fact, FIGS. 14 and 15 show a variation of this kind, wherein the operation of cutting a stop extending over the two rows of interlocking units is carried out more or less simultaneously with its moulding.

The device provided for this purpose is identical to the one shown in FIG. 9, with the single difference that a projecting cutting edge 22a is provided in the die cavity 7a in the sonotrode 1a. Of course, this edge extends longitudinally to the fastener chain, and it is positioned in the middle of the die cavity 7a.

Thus, when this device is used, the moulded stop is immediately cut lengthwise into two different stops 14e separated by a slot 24 made by the edge 22a.

It should be noted that this result is due to the particular properties of a unit activated by ultrasonic vibrations. In fact, the flat parts of such a unit, such as the bottom of the die cavity 7a, can heat a fragment of thermoplastic material and mould it into the corresponding shape, while the sharp edges, such as the edge 22a, can for their part cut the fragment of plastics material at the point in question.

Thus the device shown in FIG. 14 makes it possible immediately to obtain two separate stops on the open end of a slide fastener. A device of this kind can thus be combined with the one shown in FIG. 9 in order to make the stops at the two ends of the same fastener simultaneously. For this purpose, it is sufficient to allow a suitable gap between these two devices.

But here again, the process and the device covered by the invention can be subject to many other variations. Moreover, it should be noted that in several of the methods of operating the process and this device, these are not limited to moulding by ultrasonics. In fact, this moulding can also be done by heating the fragment of thermoplastic material from a source of heat provided by any suitable means.

I claim:

1. Apparatus for forming an end stop on a row of interlocking units of a slide fastener secured to a supporting tape, comprising a mould having two complementary mould parts defining a mould cavity therebetween, one of said parts having a base with an upstanding wall at one end extending at right angles to said base, the otherpart having an end wall other part adapted to move in a plane parallel to the plane of said upstanding wall and in juxtaposition thereto, the bottom surface of said other part having a recess extending parallel to said upstanding wall, the rear wall of said recess defining one side wall of said mould cavity and the portion of said upstanding wall in alignment with said recess when said mould is closed defining the opposed side wall of said cavity, said other mould part having spaced projections at each end respectively of said recess defining the end walls of said mould cavity, said upstanding wall having an aperture therethrough at right angles to the plane thereof, means intermittently to feed a strip of thermoplastic material through said aperture to position the end of such strip between said projections and in alignment with said mould cavity, the end wall of said other part immediately above said recess defining a cutting edge to sever the portion of such strip positioned in said mould cavity.

2. The apparatus set forth in claim 1 in which said upstanding wall has a pair of spaced projections extending outwardly therefrom and rising from said base and said movable part has its pair of depending spaced projections aligned with said first pair of projections, aligned pairs of projections having opposed surfaces in engagement when said mould is closed, said projections defining the ends of said mould cavity, the projections on said movable part each having a notch in its undersurface to accommodate the associated interlocking units of the slide fastener beneath said projections when the mould is closed.

3. The apparatus set forth in claim 1 in which the mould cavity is of width sufficient to accommodate two rows of interlocking units, whereby the end stop formed in said cavity will also join the ends of said interlocking units.

4. The apparatus set forth in claim 3 in which the top wall of said recess has a depending rib positioned along the median longitudinal axis of said recess and defining a cutting edge adapted to move into engagement with the stop formed in said mould cavity to sever said stop to form two stops each associated respectively with one of said rows of interlocking units and electrosonic vibratory means are associated with the mould part carrying said rib.

5. The apparatus set forth in claim 3 in which said upstanding wall has a recess therein adjacent said base and extending parallel to the plane thereof to accommodate the supporting tape of one of said rows, the bottom of said movable part has a recess therein also extending parallel to the plane of said base, to accommodate the supporting tape of the other of said rows, whereby when the mould is closed, the rows of interlocking units will be longitudinally aligned with and held in fixed position in said mould cavity.

6. The apparatus set forth in claim 3 in which a movable tool is provided having a cutting edge positioned along the median longitudinal axis of the mould cavity between the ends thereof, means to move said cutting edge into engagement with the stop formed in said mould cavity to sever said stop to form two stops each associated respectively with one of said rows of interlocking units.

7. The apparatus set forth in claim 6 in which electrosonic vibratory means are associated with said movable tool to effect such cutting action.

* * * * *